United States Patent [19]
Gallagher et al.

[11] Patent Number: 5,869,413
[45] Date of Patent: Feb. 9, 1999

[54] INTEGRATION OF ASPHALT AND REINFORCEMENT FIBERS

[76] Inventors: Kevin P. Gallagher, 281 Chateaugay Dr., Pataskala, Ohio 43062; Patrick L. Ault, 2795 Ritchey Rd. SE., Heath, Ohio 43056; James E. Loftus, 1239 Normandy Dr., Newark, Ohio 43055; Michael T. Pellegrin, 505 Marion Manor Woods, Newark, Ohio 43055; Donn R. Vermilion, 791 Cedar Run Rd., Newark, Ohio 43055; Frederick H. Ponn, 4234 Lancaster Rd. SW., Granville, Ohio 43023

[21] Appl. No.: 999,173

[22] Filed: Dec. 29, 1997

Related U.S. Application Data

[62] Division of Ser. No. 362,361, Dec. 22, 1994, Pat. No. 5,718,787.

[51] Int. Cl.$^6$ .............................. B32B 11/02; B05D 1/12
[52] U.S. Cl. ..................... 442/381; 442/382; 442/389; 442/390; 442/400; 442/401; 442/409; 442/411; 442/415; 442/327; 442/331; 442/366; 442/367; 442/374
[58] Field of Search .................... 442/327, 331, 442/366, 367, 374, 381, 382, 389, 390, 400, 401, 409, 411, 415

[56] References Cited

U.S. PATENT DOCUMENTS

| | | |
|---|---|---|
| 707,485 | 8/1902 | Wishart . |
| 1,289,892 | 12/1918 | Perry . |
| 2,824,048 | 2/1958 | Hupe et al. . |
| 2,904,453 | 9/1959 | Labino . |
| 3,144,376 | 8/1964 | Plumberg et al. . |
| 3,291,767 | 12/1966 | Zaayenga . |
| 3,632,415 | 1/1972 | Franklin et al. . |
| 3,745,060 | 7/1973 | Jumentier et al. . |
| 3,852,428 | 12/1974 | Powell et al. . |

(List continued on next page.)

FOREIGN PATENT DOCUMENTS

| | | |
|---|---|---|
| 0193846 | 8/1985 | European Pat. Off. . |
| 0363130 | 4/1990 | European Pat. Off. . |
| 0367661 | 8/1990 | European Pat. Off. . |
| 0554119 | 8/1993 | European Pat. Off. . |
| 2038949 | 2/1971 | Germany . |
| 51024682 | 9/1980 | Japan . |
| 501725 | 1/1984 | Japan . |
| 60-173113 | 9/1985 | Japan . |
| 7316929 | 9/1985 | Japan . |
| 9500453 | 11/1995 | WIPO . |

OTHER PUBLICATIONS

Technical Bulletin, Shell Chemical Co., SC:57–84, "Kraton @ Thermoplastic Rubber in Asphalt Products", Column 2.
J.B. Speight, *The Chemical Technology of Petroleum*, Marcel Dekker Inc., New York 1991, pp. 16, 19–21, 482–486.
P.E. Moschopedis and J. G. Speight, "The Effect of Air Blowing on the Properties and Constitution of a Natural Bitumen", *Journal of Materials Science* ?12,(1977) 990–998, pp. 990, Column 2.

*Primary Examiner*—Richard Weisberger

[57] ABSTRACT

A method for producing asphalt fibers includes supplying molten asphalt to a rotating asphalt spinner, centrifuging asphalt fibers from the asphalt spinner, and collecting the asphalt fibers. The molten asphalt is supplied to the asphalt spinner at a temperature within the range of from about 270° to about 500° F. Also disclosed is a method for integrating asphalt with reinforcement fibers including the steps of establishing a downwardly moving veil of reinforcement fibers, such as glass fibers, and centrifuging asphalt fibers from a rotating asphalt spinner positioned within the veil of reinforcement fibers to integrate the asphalt with the reinforcement fibers. A method for making an asphalt roofing shingle includes the steps of assembling together a mat of asphalt fibers with a mat of reinforcement fibers, coating the assembled mats to form an asphalt coated sheet, applying granules to the asphalt coated sheet, and cutting the asphalt coated sheet into roofing shingles. The invention also includes the asphalt roofing shingle made by this process. Further, the invention includes asphalt highway reinforcement products containing asphalt fibers, and the method of making such products.

20 Claims, 6 Drawing Sheets

U.S. PATENT DOCUMENTS

| | | |
|---|---|---|
| 3,861,971 | 1/1975 | Stapleford et al. . |
| 3,886,021 | 5/1975 | Breckenfelder . |
| 4,117,051 | 9/1978 | Ishikawa et al. . |
| 4,166,752 | 9/1979 | Marzocchi et al. . |
| 4,394,481 | 7/1983 | Grossi et al. . |
| 4,399,186 | 8/1983 | Lauderback . |
| 4,419,489 | 12/1983 | Grossi et al. . |
| 4,436,767 | 3/1984 | Zaayenga . |
| 4,436,864 | 3/1984 | Grossi et al. . |
| 4,636,414 | 1/1987 | Tajima et al. . |
| 4,696,847 | 9/1987 | Cousin et al. . |
| 4,762,652 | 8/1988 | Miyamori et al. . |
| 4,820,078 | 4/1989 | Brocious . |
| 4,871,605 | 10/1989 | Pagen et al. . |
| 4,873,303 | 10/1989 | Blackwood et al. . |
| 4,956,199 | 9/1990 | Ruisi et al. . |
| 4,996,037 | 2/1991 | Berkebile et al. . |
| 5,064,714 | 11/1991 | Yamaguchi et al. . |
| 5,091,072 | 2/1992 | Tsuchitani et al. . |
| 5,213,677 | 5/1993 | Yamamoto et al. . |
| 5,242,493 | 9/1993 | Glynn et al. . |
| 5,326,241 | 7/1994 | Rook et al. . |
| 5,468,546 | 11/1995 | Loftus et al. . |

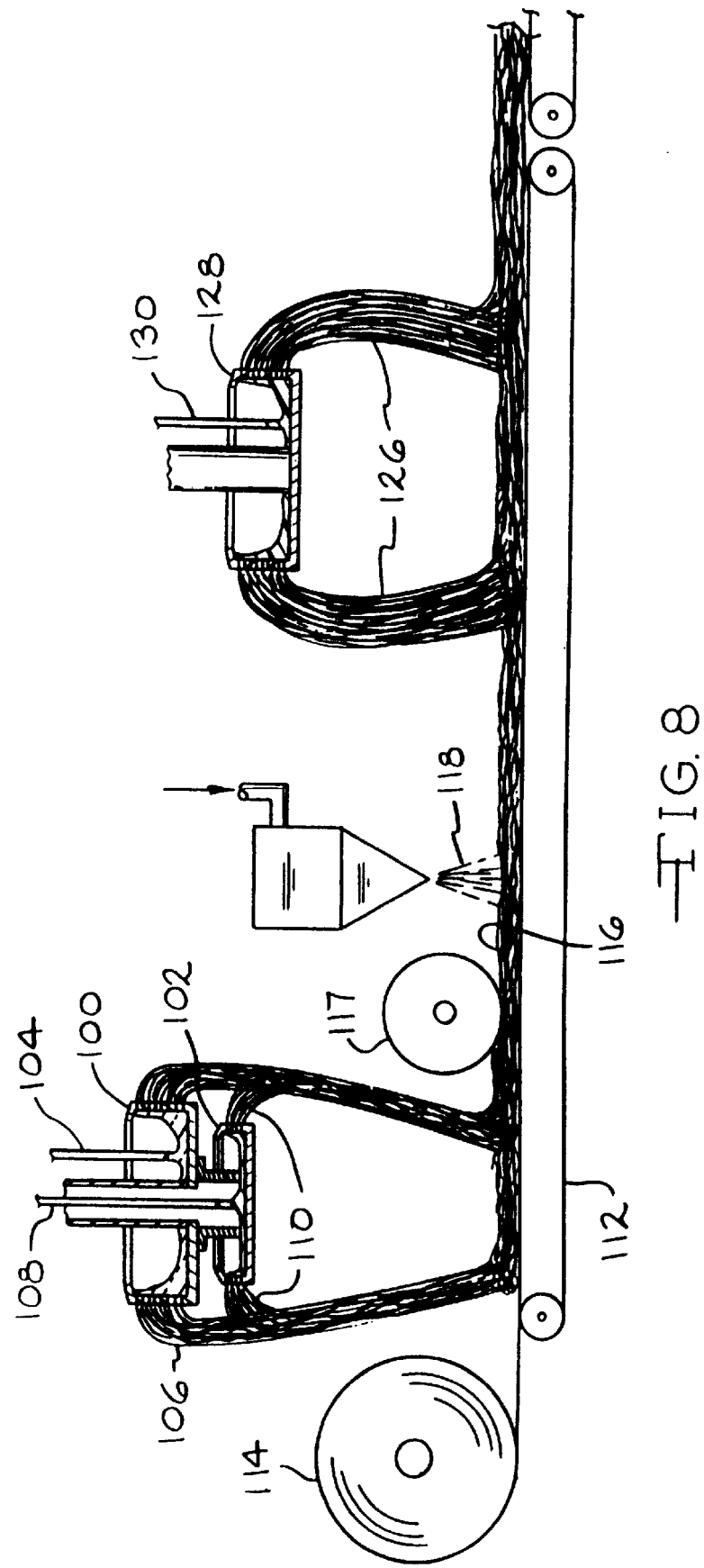

INTEGRATION OF ASPHALT AND REINFORCEMENT FIBERS

SPECIFICATION

CROSS REFERENCE TO RELATED APPLICATION(S)

This is a division of U.S. patent application Ser. No. 08/362,361, filed Dec. 22, 1994 now U.S. Pat. No. 5,718,787.

TECHNICAL FIELD

This invention pertains to the manufacture of asphaltic products. More particularly, this invention relates to asphalt products in a fibrous form, and methods for producing fibrous forms of asphalt.

BACKGROUND

Asphaltic products have been produced in various forms, with the primary uses of asphalt being in paving and in roofing products. The common source of asphalt is the residue or bottoms from the petroleum refining industry. This asphalt must be further refined or processed by air blowing (oxidizing) in order to raise the softening point and increase the stiffness to make useful products for roofing and specialty asphalt products. Some asphalt products have improved properties because of the addition of natural or synthetic rubbers or other organic additives.

While asphalt itself has many beneficial properties, it lacks inherent tensile strength and integrity. Therefore many asphalt products are reinforced with such materials as glass fibers or organic fibers such as polymer fibers, and have fillers such as ground limestone. For example, asphalt roofing shingles are based on an interior web or carrier of a wet process glass fiber mat, and the asphalt itself contains about 65 percent by weight ground limestone filler. Other fillers used in asphalt products include carbon black, finely ground tires, clay, ground glass and beads of various inorganic or organic materials.

One of the problems with reinforcing asphalt is that it is often difficult to integrate the reinforcement material into the asphalt matrix, particularly in a uniform manner. Typically, integrating the asphalt and the reinforcement is accomplished by fixing the reinforcement material into a mat or web, and applying the asphalt in molten form, as is the case in manufacturing asphalt roofing shingles. Shingle manufacturing consists of running a continuous wet process glass fiber mat into a bath of molten asphalt to cause a coating on both sides of the mat as well as filling the interstices between the individual glass fibers. This process is limited in that it can only apply a relatively uniform coating, similar to a film. It would be advantageous to be able to apply layers of asphalt into various products where the layers are not films, but are rather porous mats or other types of non-uniform layers. Also, the coating process requires assembly of the ultimate product at a manufacturing facility with a liquid asphalt coater. It would be advantageous to be able to assemble products containing asphalt layers at field locations, such as at a road repair site.

Another known method for integrating asphalt with reinforcements is to mix the asphalt with loose or particulate reinforcement materials. Such mixing requires significant energy and capital equipment, and is not always successful in providing a uniform mix of asphalt and reinforcement. It would be advantageous to be able to uniformly intermix or integrate asphalt with reinforcement materials which are in an unfixed or loose form, rather than bound into a fixed product such as a mat. Also, it would be advantageous to be able to introduce the asphalt itself into various products in forms other than as a liquid.

Numerous reinforcement layers have been used for reinforcing highway systems. Such well known reinforcement layers include glass fibers in mat form, either woven or nonwoven, asphalt impregnated mats, mats of organic materials, such as polyester fibers, mats in the form of an open weave or grid, and layers of glass fibers or other reinforcement fibers. These reinforcement layers are applied to the roadway beneath subsequently applied bituminous aggregate asphalt layers to reinforce the bituminous aggregate. Such reinforcement layers are typically used in locations where the underlying pavement has cracked, and the highway system is being repaired. Reinforcement layers can also be used on the entire highway for repaving or as original construction. Also, reinforcement layers can be used for special applications such as bridge decks. It is well known to use a tack coat on any of these highway reinforcement products to secure the reinforcement product to the roadway prior to applying the paving layer.

One of the problems with currently available highway reinforcement products is that assembling various layers making up the highway reinforcement is a time consuming and costly process. Also, it is difficult to accurately meter out the asphalt layers in such products. Further it is not easy to fully integrate reinforcement layers of the highway reinforcement product with the asphalt without completely impregnating the reinforcement layer in a molten asphalt bath. Finally, it would be advantageous to be able to produce highway reinforcement products with higher strength without having to increase the materials used.

DISCLOSURE OF INVENTION

There has now been developed asphalt in fibrous form, and a method of producing asphalt fibers. The asphalt fibers are a new form of asphalt, and they can be used in traditional asphalt applications such as paving, roofing and specialty products, as well as new products. The asphalt fibers can be formed in a rotary process by centrifuging, and can be collected as fibrous asphalt webs. The webs can be incorporated into numerous products as a layer of asphalt material.

According to this invention, there is provided a method for producing asphalt fibers comprising supplying molten asphalt to a rotating asphalt spinner; centrifuging asphalt fibers from the spinner; and collecting the asphalt fibers. The asphalt can be modified with one or more organic modifiers from the group consisting of natural rubber, synthetic rubber, elastomers, polymers, resins and other thermoplastic or thermoset materials. Preferably, the modifiers are present in an amount within the range of from about 2 to about 30 percent (weight percent of the total organic composition). Most preferably, the modifiers are present in an amount within the range of from about 4 to about 12 percent.

In a specific embodiment of the invention, the molten asphalt is supplied to the asphalt spinner at a temperature within the range of from about 270° to about 500° F., as measured at a delivery point just above the spinner.

In another embodiment of the invention, the asphalt is subjected to an oxidizing process sufficient to give the asphalt a softening point within the range of from about 180° to about 350° F., and preferably within the range of from about 200° to about 270° F., prior to the fiberizing process. All softening points are measured using the ring and ball method.

In yet another embodiment of the invention, the centrifuging step provides acceleration to the molten asphalt sufficient to produce primary asphalt fibers having a diameter within the range of from about 25 to about 60 hundred thousandths of an inch (Ht).

In a specific embodiment of the invention, the spinner has a peripheral wall with between 500 and 25,000 orifices through which the asphalt is centrifuged. Preferably, the asphalt spinner has between 500 and 10,000 orifices.

In yet another embodiment of the invention, asphalt is centrifuged by the asphalt spinner to form primary asphalt fibers, and the primary asphalt fibers are further attenuated by an annular, downwardly moving gaseous flow from a blower to form a downwardly moving veil of asphalt fibers.

According to this invention, there is also provided asphalt fibers having diameters smaller than 250 Ht. Preferably the diameter of the asphalt fibers is within the range of from about 25 to about 150 Ht, with the asphalt having a softening point within the range of from about 180° to about 350° F., and preferably within a range of from about 200° to about 270° F., in an unfilled state. Most preferably, the diameter of the asphalt fibers is within the range of from about 25 to about 60 Ht. The asphalt fibers can be filled with a filler, and can be reinforced with reinforcement fibers, such as glass fibers.

According to this invention, there is also provided a mat of asphalt fibers, the fibers having diameters within the range of from about 25 to about 60 Ht, and the asphalt having a softening point within the range of from about 180° to about 350° F. The mat can be laminated as a layer to a mat of reinforcement material, such as a wet process glass fiber mat, to make a layered asphalt product.

Also contemplated within this invention is a method for making an asphalt roofing shingle including the steps of assembling together a layer of asphalt fibers with a mat of reinforcement fibers, coating the assembled mats with asphalt to form an asphalt coated sheet, applying granules to the asphalt coated sheet, and cutting the asphalt coated sheet into roofing shingles. The invention also includes the asphalt roofing shingle made by this process.

According to this invention, there is also provided a method for integrating asphalt with reinforcement fibers including the steps of establishing a downwardly moving veil of reinforcement fibers of heat-softenable material, such as glass fibers, supplying molten asphalt to a rotating asphalt spinner positioned within the veil of reinforcement fibers, centrifuging asphalt fibers from the asphalt spinner in a manner which directs the asphalt fibers into engagement with the veil to integrate the asphalt with the reinforcement fibers, and collecting the integrated asphalt and reinforcement fibers.

Another aspect of this invention is the use of the asphalt fibers of the invention as the input product for a carbonizing process. Carbon fibers are prepared by the controlled pyrolysis of an organic precursor in fibrous form. Commercial products have been based on rayon, polyacrylonitrile and pitch (derived from coal tar, petroleum and other sources). The process involves a number of common steps for all materials. First, fibers are produced by extrusion or melt blowing. Then the fibers are stabilized by oxidation at temperatures within the range of 200° to 450° C., usually in air. The oxidation process gives the fiber enough structure at the molecular level to maintain its shape during the carbonization process. Finally, the fiber is carbonized at temperatures exceeding 800° C. in an inert atmosphere such as argon. To improve properties the fibers are stretched during the carbonizing step to orient the molecules. Heating to higher temperatures (2500° to 3000° C.) also increases the modulus and strength. The resultant carbon fibers have a wide variety of uses.

Pitch fibers are made from petroleum or coal tar pitch, and are highly aromatic, containing a large proportion of asphaltenes (about 80 to 90 percent, as measured by heptane precipitation by ASTM 3279-78). The melting point of pitch is preferred to be near 260° C., with a glass transition temperature of about 85° C. Many pitches are not compatible with polymers.

In contrast to the pitch fibers, the asphalt used to make the asphalt fibers of the current invention contains 0 to 35 percent asphaltenes, and typically 15 to 25 percent. The asphaltene content is kept low to insure compatibility with polymers added. The glass transition temperature of the asphalt in with the range of from about −15° to about −5° C. The melting point of the asphalt is typically within the range of from about 93° to about 116° C.

An additional aspect of the invention is a method for making highway reinforcement products including establishing a downwardly moving veil of reinforcement fibers of heat-softenable material, supplying molten asphalt to a rotating asphalt spinner positioned within the veil of reinforcement fibers, centrifuging asphalt fibers from the asphalt spinner, thereby directing the asphalt fibers into engagement with the veil to integrate the asphalt with the reinforcement fibers, feeding a reinforcement mat beneath the asphalt spinner, and collecting the integrated asphalt and reinforcement fibers on top of the reinforcement fibers to form a highway reinforcement product. The invention also includes the highway reinforcement product produced by this method.

By supplying the asphalt layer in the form of asphalt fibers, the process of making highway reinforcement products is less time consuming and costly. The asphalt layers in such products can be more accurately metered out, and the asphalt and the reinforcement fibers can be easily integrated. Further, the use of asphalt fibers in highway reinforcement products enables products of higher strength without having to increase the materials used. Also, since it is not necessary to dip the reinforcement mat into a bath of molten asphalt, the highway reinforcement can be made without the expense and hazards of an open asphalt bath.

BRIEF DESCRIPTION OF DRAWINGS

FIG. 8 is a schematic view in elevation of a process for making a highway reinforcement product according to the invention.

BEST MODE FOR CARRYING OUT THE INVENTION

As used in this specification, all references to percentage are as a percent by weight. The term "asphalt", as used in this specification includes materials sometimes referred to as "bitumen", and the two terms are viewed as synonymous with each other. The asphalts which can be employed in this invention can be either a naturally occurring asphalt or a manufactured asphalt produced by refining petroleum, and may include straight-run fractional-derived asphalts, cracked asphalts, asphalts derived from processing such as asphalt oxidizing, propane deasphalting, steam distilling, chemically modifying, and the like. In one of its preferred embodiments, the invention is applicable to asphalts for roofing shingle production. The asphalt can be either modified or unmodified.

Figure 1:
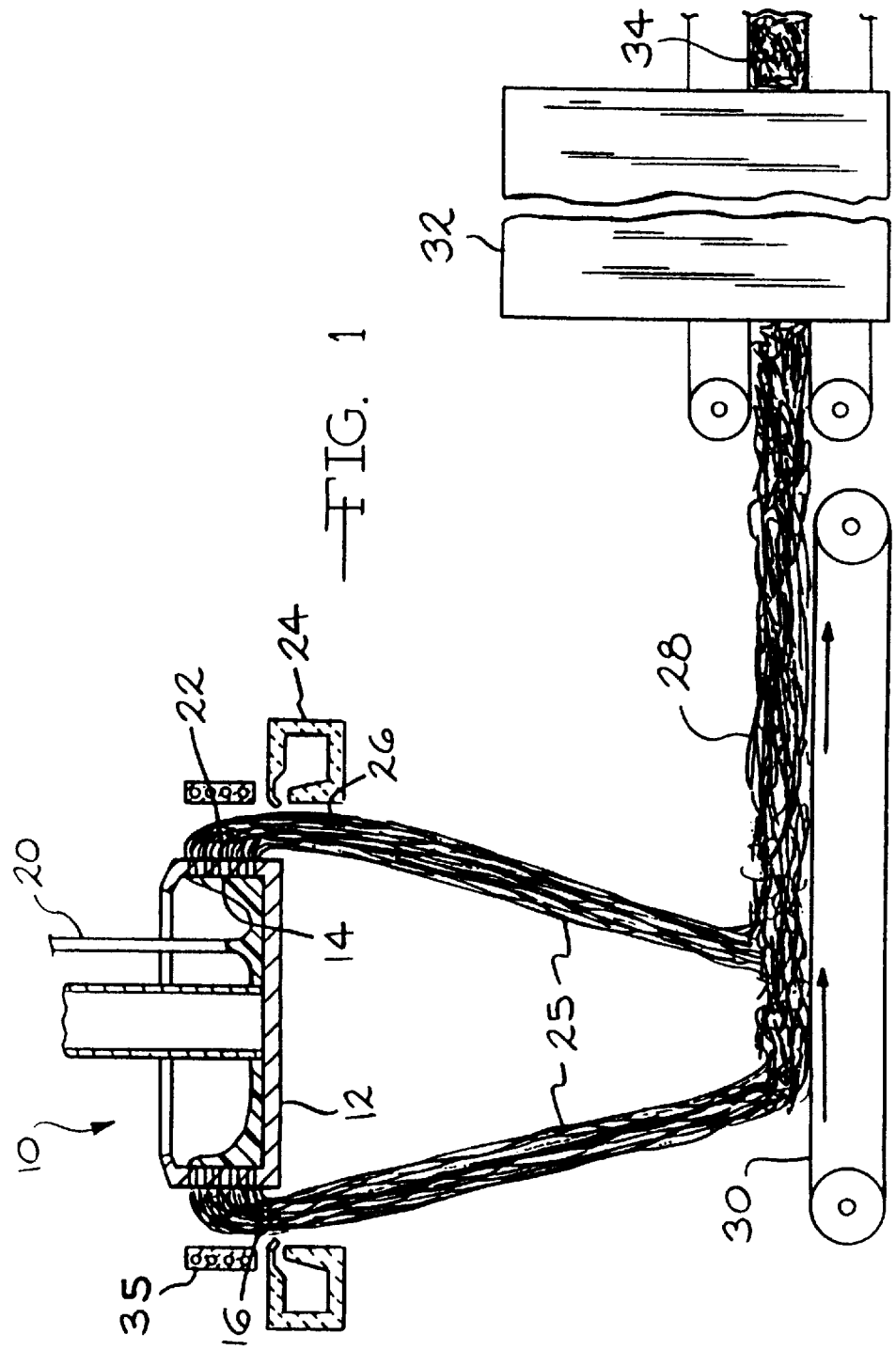
FIG. 1 is a schematic sectional view in elevation of apparatus for centrifuging asphalt fibers according to the method of the invention.

As shown in FIG. 1, the apparatus for producing asphalt fibers from a rotary process includes rotatably mounted asphalt spinner 10 which is comprised generally of spinner bottom wall 12 and spinner peripheral wall 14. The asphalt spinner can be cast from nickle/cobalt/chromium alloy as used for the production of glass fibers, or can be any other suitable spinner such as one from welded stainless steel. The spinner peripheral wall has numerous orifices 16 for the centrifugation of asphalt fibers, and preferably has between about 500 and about 25,000 orifices.

Molten asphalt is dropped into the rotating asphalt spinner as stream 20. Upon reaching the spinner bottom wall, the molten asphalt is driven radially outwardly and up the peripheral wall where centrifugal force centrifuges the asphalt through the orifices as asphalt streams or primary asphalt fibers 22. After emanating from the asphalt spinner, the primary asphalt fibers are directed downwardly by annular blower 24 to form a downwardly moving flow or veil 25 of asphalt fibers. Any means can be used for turning the fibers from a generally radially outward path to a path directed toward a collection surface.

In one embodiment of the invention, centrifugal attenuation by the rotation of the asphalt spinner is sufficient to produce asphalt fibers of the desired fiber diameter, and no further attenuation is needed. The centrifuging process provides acceleration to the molten asphalt sufficient to produce primary asphalt fibers having a diameter below about 250 Ht, preferably within the range of from about 25 to about 150 Ht, an most preferably within the range of from about 25 to about 60 Ht. In another embodiment of the invention, secondary attenuation is used to further attenuate the primary fibers. In that case the blower is supplied with sufficient air pressure to pull the primary fibers and further attenuate them into the desired final asphalt fiber diameter. As shown in FIG. 1, the blower attenuates the primary fibers into final fibers 26, which are collected as asphalt fiber web 28 on any suitable collection surface, such as conveyor 30.

Figure 4:
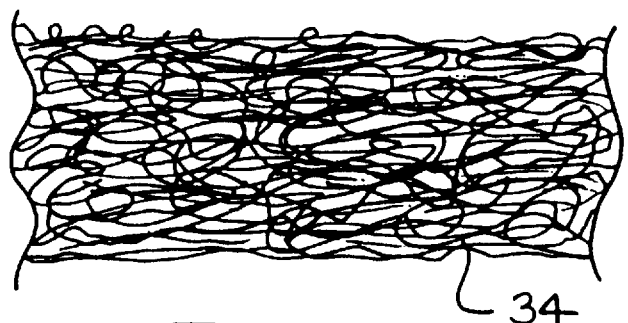
FIG. 4 is a perspective view of an asphalt fiber mat of the invention.

Subsequent to the asphalt fiber forming step, the asphalt fiber web can be transported through any further processing steps, such as oven 32, to result in the final asphalt product, such as mat 34, which is also shown in FIG. 4. Further processing steps could also include laminating the asphalt fiber mat or layer with a reinforcement layer, such as a glass fiber mat. The asphalt fiber mat is porous, having a porosity within the range of from about 20 to about 50 CuFt./min. on a 1 in. square sample with a one-half inch water pressure drop. Preferably the asphalt fiber mat has a porosity within the range of from about 30 to about 40 CuFt./min. The mat has a density within the range of from about 2 to about 10 pounds per cubic feet (pcf), and preferably within the range of from about 3 to about 5 pcf. The mat has a high degree of flexibility and conformability (ability to be molded or shaped around sharp corners) when compared to an asphalt film of the same density or thickness.

An optional feature of the invention is the use of a heating means, such as induction heater 36, to heat either the asphalt spinner, or the primary asphalt fibers, or both, to facilitate the asphalt fiber attenuation. By heating the primary asphalt fibers, the process of further attenuation into the final asphalt fibers is enhanced. Even without the need for secondary attenuation by the blower, an auxiliary heat source can be used to maintain the temperature of the asphalt spinner at the level for optimum centrifugation of the asphalt into fibers. Other heating means for the asphalt spinner can be employed, such as electric resistance heating. The temperature of the asphalt spinner should be within the range of from about 270° to about 500° F., and preferably within the range of from about 330° to about 420° F.

EXAMPLE I

Venezuelan Lagovan flux was oxidized in a converter to a softening point of 240° F. At this softening point the asphalt had a viscosity at 350° F. of 4,300 cps and a penetration of 17 dmm at 25° C., as measured by ASTM D-5. The oxidation was advanced sufficiently to be able to form fibers, but not so far as to cause the asphalt to become brittle at room temperature. No filler was added to the asphalt. The asphalt was heated in a hot melt heater prior to delivery to the asphalt spinner, and delivered to the asphalt spinner at a temperature of 350° F. The asphalt spinner had a diameter of 15 inches, and was rotated at 2300 RPM. The spinner peripheral wall was adapted with 854 orifices, each being 0.034 inches in diameter. There was no external heating from a burner, and no secondary attenuation from a blower. The asphalt fibers were collected as a porous mat.

EXAMPLE II

The oxidized Lagovan flux of Example I was further modified with 4 percent Kraton 1184. The polymer was incorporated into the asphalt by mixing in a Ross shear mixer at 400° F. for about 60 minutes. The resulting modified asphalt had a viscosity at 350° F. of 110,000 cps, a softening point of 285° F., and a penetration of 14 dmm at 25° C. The asphalt was delivered at a temperature of 400° F. to the asphalt spinner of Example I rotating at 1700 RPM, and asphalt fibers were centrifuged. These fibers were noticeably longer, stronger and less tacky than the fibers from Example I.

EXAMPLE III

A mixture of 96 percent Lagovan flux (softening point 104° F.) and 4 percent Kraton 1102 was air blown at 475° F. for 3 hours and 50 minutes. The resulting asphalt had a softening point of 244° F., a penetration of 20 dmm at 25° C., and a viscosity at 350° F. of 11,250 cps. The asphalt was further processed by heat conditioning at 330° F. for 2 hours to raise the viscosity, resulting in an asphalt having a softening point of 245° F. and a viscosity at 350° F. of 26,900 cps. The asphalt was delivered at a temperature of 360° F. to the asphalt spinner of Example I rotating at 1356 RPM. The resulting asphalt fibers were an open-type web.

EXAMPLE IV

The oxidized Lagovan flux of Example I was modified by mixing it with 10 percent Himont Profax 6301 polypropylene in a shear mixer. The resulting asphalt had a softening point of 302° F., a penetration of 7 dmm at 25° C., and a viscosity at 350° F. of 110,000 cps. The asphalt was delivered at a temperature of 409° F. to the asphalt spinner of Example I rotating at 1229 RPM. The resulting asphalt fibers were drier, less tacky and more lofty than any of the asphalt fiber samples from Examples I–III.

EXAMPLE V

The diameter of asphalt fibers produced in examples I–IV was measured by first preparing a sample by fixing a 1 inch by 1.5 inch thin asphalt fiber mat specimen on a microscope slide with a cover slip. The microscope was equipped with 200× capability, a video camera, and a monitor. Transmitted light was used for all measurements in a bright field mode. A pair of dial calipers capable of measuring to 0.1 mm and a calibration slide with divisions of at least 10 microns and a total length of at least 100 microns was used. The calibration slide was placed on the stage and 100 microns was measured off the video monitor using the dial calipers. From this measurement, a relationship was calculated from the actual size of the scale (100 microns) and the measured size from the monitor. The sample slide was then placed on the stage and 100 fibers were measured off the monitor. Only fibers which were separate from their neighbors (not fused or closely entangled) were measured. The actual fiber diameters were calculated, based on the calibration data, and averaged. As used in this specification, the term "having a diameter" within a certain range means that about 95 percent of the asphalt fibers in a random sample have a diameter within that specified range.

The results of asphalt fiber diameter measurements are shown in Table I. The capability to measure asphalt fiber diameters using the above method is made more difficult because of the black color of the asphalt. Because of this it is difficult to discern which fibers, if any, are twinned (fused along the axis) or otherwise closely entangled. For this reason the measurements shown in Table I may be skewed towards higher values than actually measured. Because of differences in the asphalt formulations, some samples have a natural tendency to fuse or twin more than others.

As a comparison, fiber diameters from a dried bottle grade polyethyleneterphthalate (PET) sample made by a similar rotary fiberizing process are included as a control in Table I. The PET material used was Eastman Kodapet dried at 230° C. overnight. The PET fibers were made by centrifuging molten PET delivered at 600° F. to a 15 in. diameter spinner with 2400 holes having a diameter of 0.016 in. The spinner was rotated at 1600 RPM. The PET fibers exhibited some fusing and entangling. Some of the PET fibers were twinned, and the fibers exhibited brashiness (lack of slipperiness when rubbing one fiber against another).

EXAMPLE VI

The asphalt of Example II was enhanced by the addition of clay filler to make up 10 percent of the total composition by weight. The fibers were stiffer than the fibers produced in Example II, and were also drier and shorter. Preferably the amount of filler is within the range of from about 2 to about 30 percent by weight of the total weight of asphalt and filler.

TABLE I

FIBER DIAMETER DISTRIBUTION

| Sample | Ave. fiber Diameter (Ht) | Standard Deviation |
| --- | --- | --- |
| Example II | 31 | 16 |
| Example IV | 68 | 28 |
| Example V | 23 | 9 |
| Example VI | 36 | 19 |

Figure 2:
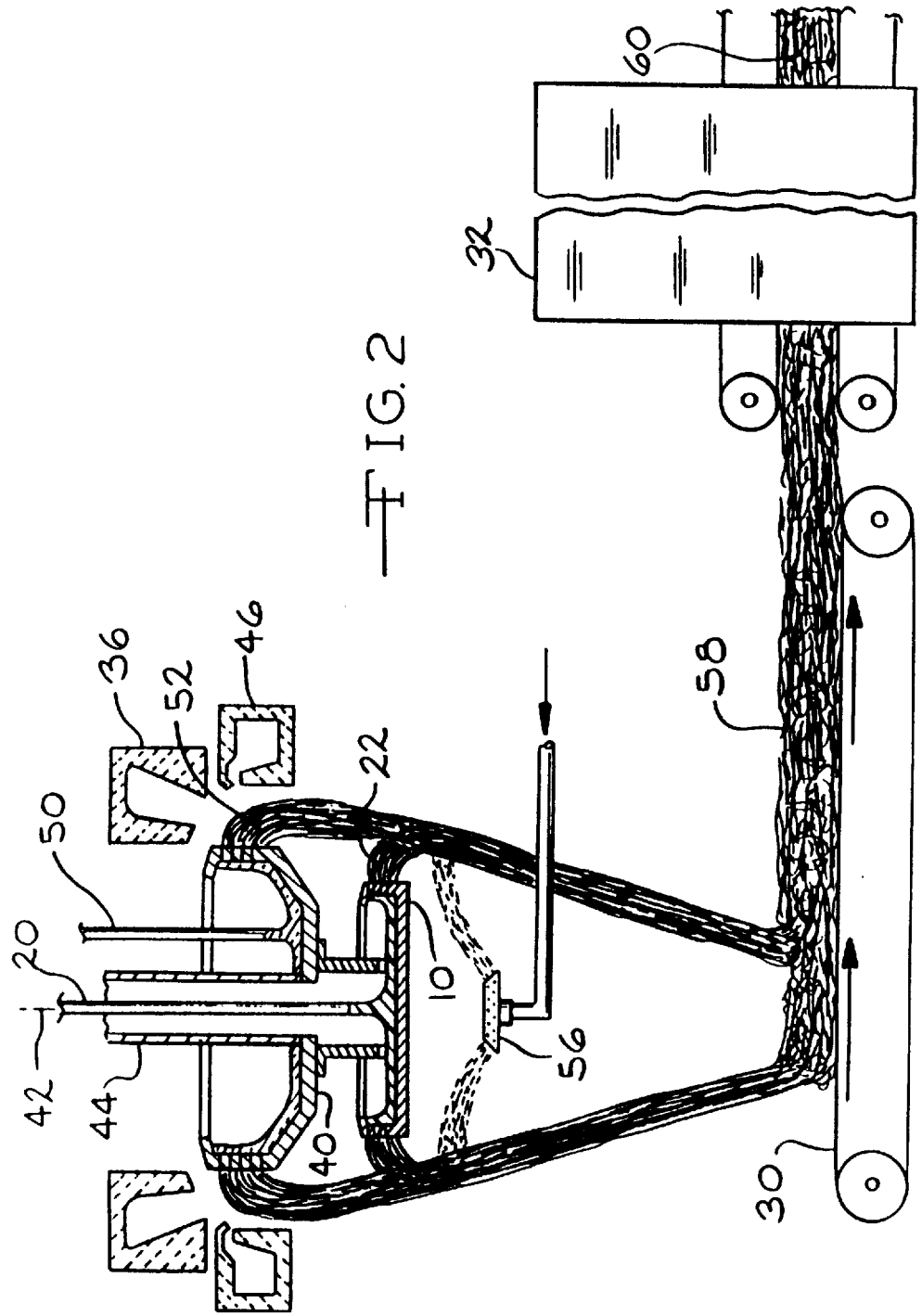
FIG. 2 is a schematic sectional view in elevation of apparatus for cofiberizing asphalt fibers and glass fibers according to the method of the invention.

The process for fiberizing asphalt with a rotating asphalt spinner can be used in combination with a rotary glass fiber forming process to integrate asphalt with glass fibers. As shown in FIG. 2, the asphalt spinner 10 is positioned beneath a conventional glass spinner 40 of the type well known for producing glass fibers. The asphalt spinner is preferably mounted beneath the glass spinner bottom wall for coaxial rotation with the glass spinner on axis 42. Molten asphalt stream 20 drops through hollow quill 44 which rotatably supports the glass spinner. Attenuation of the glass fibers can be facilitated by annular blower 46 and annular burner 48, in a manner well known in the art of making glass fibers.

Molten glass is dropped as stream 50 into the spinner, and is centrifuged as glass fibers 52 and turned downwardly as a flow of fibers and gases, or veil 54. An additive apparatus, such as binder nozzle 56, can be positioned either within the veil or outside the veil, for applying any binder or other coatings or particles desired, or for supplying liquids for cooling the asphalt fibers.

In operation the asphalt fibers are distributed radially outwardly from the asphalt spinner and they intermingle with the glass fibers in the veil and are collected on the conveyor as an intermingled mass 58 of asphalt fibers and glass fibers. Since the glass fiber forming process necessarily operates at temperatures above the softening point of glass, the area surrounding and immediately below the glass spinner is very hot. It is possible that some of the asphalt fibers will be entrained in some of the hot gases flowing with the veil of fibers, and thereby experience temperatures sufficient to soften or melt the asphalt fibers. In such a case, some of the asphalt material may attach itself to some of the glass fibers to form asphalt particles on the fibers. The asphalt may also be in the form of a coating on some of the fibers. Care must be taken not to introduce the asphalt into a region with temperatures so hot as to ignite the asphalt. The mass of intermingled asphalt and glass fibers can be transported to any suitable processing station, such as oven 32 before becoming asphalt/glass fiber product 60.

EXAMPLE VII

The asphalt sample of Example IV was cofiberized with glass fibers with apparatus similar to that shown in FIG. 2. The resulting mass of intermingled asphalt and glass fibers was collected as an insulation product, which looked like black fiberglass insulation. The asphalt/glass fiber insulation product had between 60 and 65 percent by weight organic components, although the weight percent of the organic components can be within the range of from about 20 to about 80 percent of the asphalt/glass fiber commingled product. Four individual samples were prepared, with the results shown in Table II.

TABLE II

ASPHALT/GLASS FIBER INSULATION PROPERTIES

| Sample | Thickness (in.) | Weight (grams) | Density (pcf) | Thermal Conductivity (k) | Thermal Resistivity (R) |
|---|---|---|---|---|---|
| 1 | 0.8 | 70 | 2.13 | 0.236 | 3.39 |
| 2 | 0.8 | 72 | 2.19 | 0.237 | 3.37 |
| 3 | 1.0 | 145 | 3.54 | 0.231 | 4.33 |
| 4 | 1.0 | 138 | 3.36 | 0.235 | 4.26 |

Figure 3:
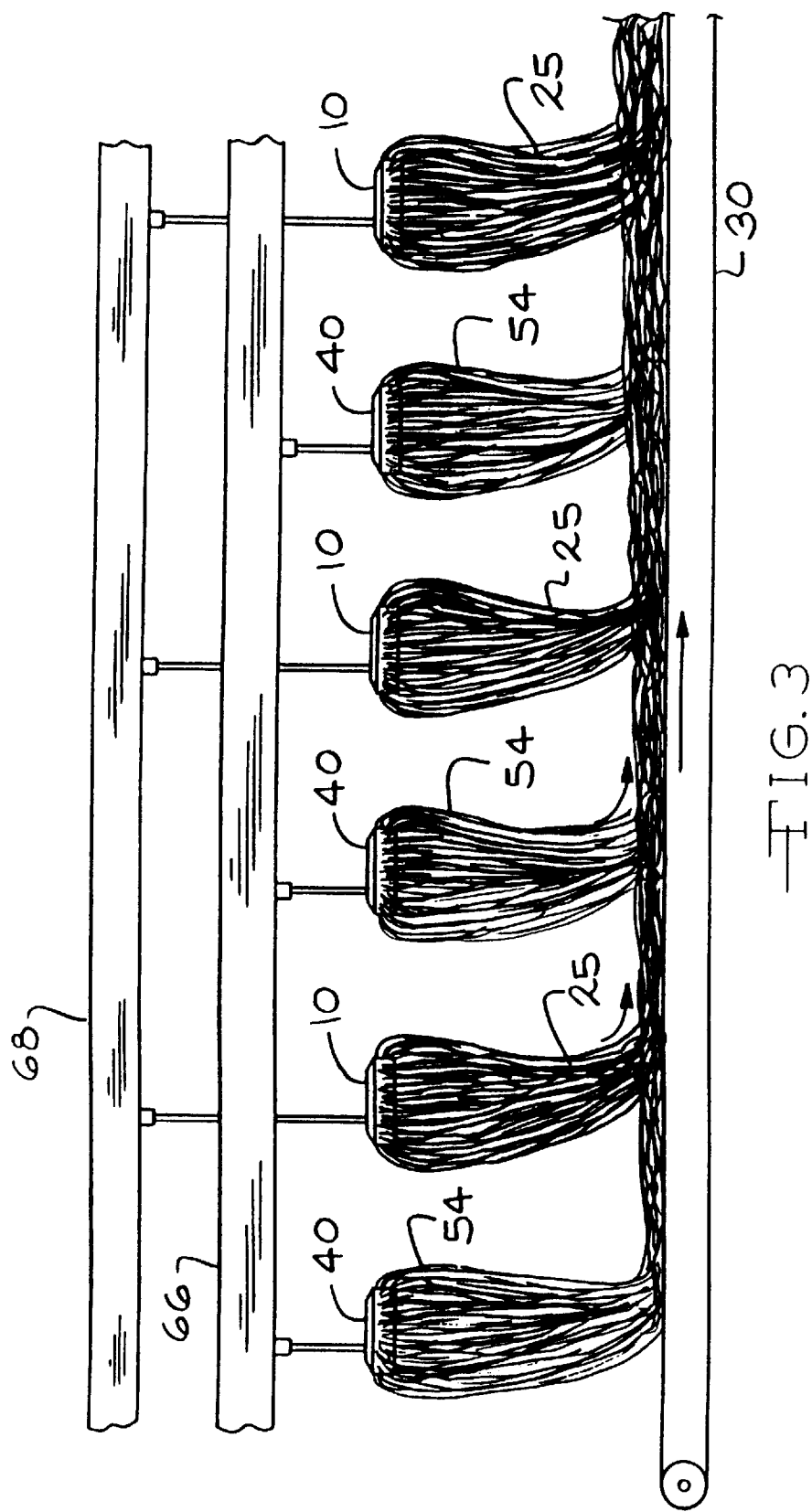
FIG. 3 is a schematic view in elevation of apparatus for alternately commingling veils of asphalt fibers with veils of glass fibers.

As an alternative to the coaxial fiberizing explained above and shown in FIG. 2, alternate commingling of veils of asphalt fibers and glass fibers can also be used, as shown in FIG. 3. The asphalt fibers can be integrated with the glass fibers by centrifuging glass fibers from one or more rotary glass spinners 40 which are supplied with molten glass by any suitable delivery means, such as forehearth 66 to establish one or more downwardly moving veils 54 of glass fibers. The glass fiber veils are positioned above collecting surface 30, and the veils of glass fibers are aligned generally along the length of the collecting surface. Asphalt fibers are centrifuged by one or more rotary asphalt spinners 10 to establish one or more downwardly moving veils 25 of asphalt fibers also positioned above the collecting surface. The asphalt material can be supplied in molten form from a common source, such as asphalt supply conduit 68. The veils of asphalt fibers are aligned along the length of the collecting surface, generally colinearly with the veils of glass fibers, in an alternating fashion, with the veils of glass fibers. The result is that the asphalt fibers and glass fibers intermingle and are collected as integrated asphalt fibers and glass fibers. Subsequently, the integrated asphalt and glass fibers can be further processed into the desired asphalt/glass fiber product. In an alternative embodiment, a single asphalt spinner is positioned between a pair of glass spinners.

The asphalt fiber mat 34 of the invention, shown in FIG. 4, can be incorporated into numerous applications, particularly in the construction industry. Possible uses include glass mat thermoplastics, filtration, sound absorption, gasketing, sorbents, adhesives, mat binders, moisture resistant layers, corrosion resistant layers, insulation, polymer placement for shingle modification, application of a conforming layer without the need for heating or a solvent, impact absorbing layers and highway resurfacing.

The integrated glass fibers and asphalt can be subjected to a compressing or consolidation step which forms a more dense product. Prior to consolidation the integrated glass fibers and asphalt preferably has a density within the range of from about 2 to about 15 pcf, while after consolidation the integrated glass fibers and asphalt product preferably has a density within the range of from about 65 to about 120 pcf. The consolidated product will have uses in various products including vibration damping material, molding material, insulation, and floor tile substrates.

Figure 5:
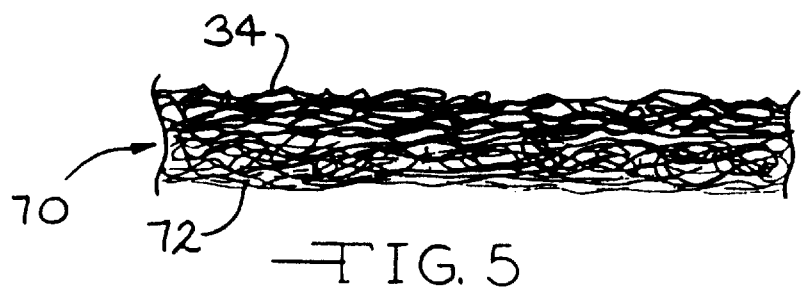
FIG. 5 is a schematic cross-sectional view in elevation of a laminated mat containing an asphalt fiber mat and a reinforcing mat.

When the asphalt fiber mat is used in highway construction and repair, the asphalt fiber mat can be laminated with reinforcement mats, such as a wet process glass fiber mat to form a reinforcement layer. The reinforcement layer is useful in various other construction applications as well as highway construction. As shown in FIG. 5, a laminated mat 70 can be formed by laminating together asphalt mat 34 and a reinforcement layer, such as continuous glass fiber mat 72. The laminated mat can be used as a stress absorbing membrane interlayer in various construction applications, such as highways.

Figure 7:
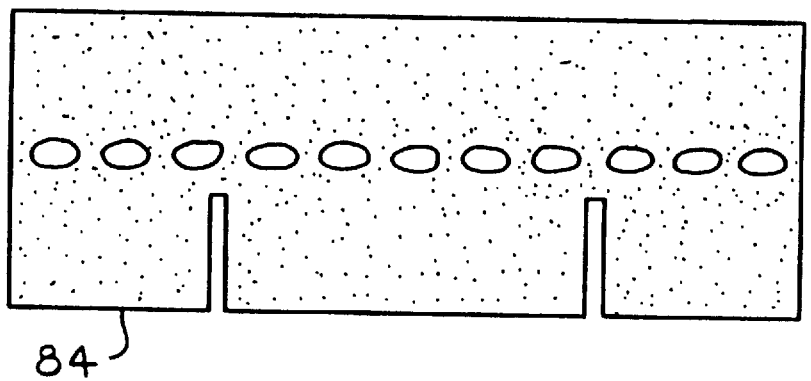
FIG. 7 is a schematic plan view of an asphalt roofing shingle of the invention.
Figure 6:
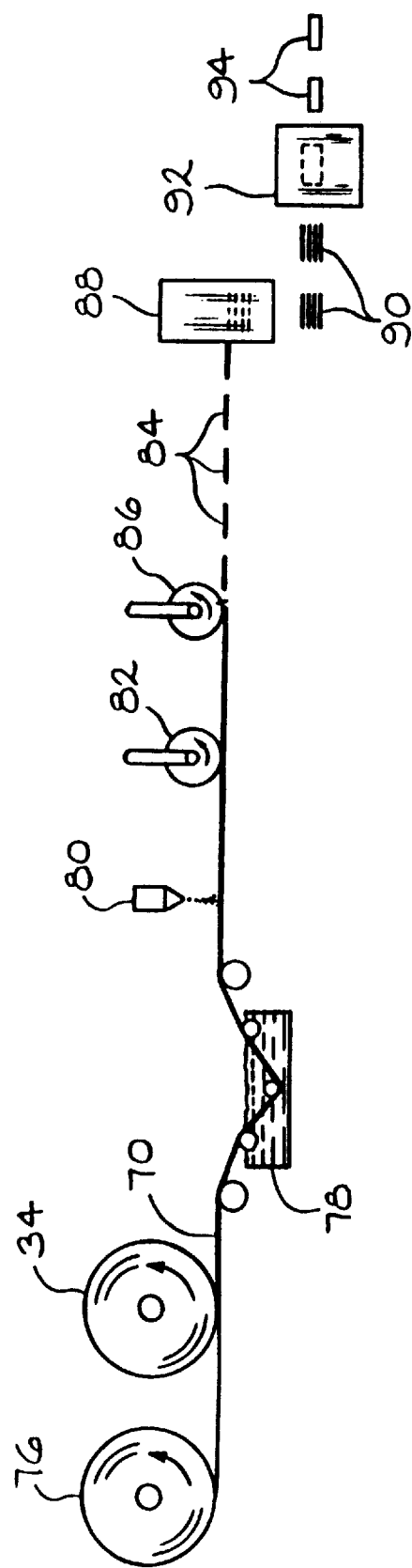
FIG. 6 is a schematic view in elevation of a process of making asphalt roofing shingles according to the invention.

The use of the asphalt fiber mat in a shingle process is shown in FIG. 6, in which wet process shingle mat 76 and asphalt fiber layer 34 are laminated together to form laminated mat 70. The laminated mat is fed into asphalt coater 78, and granules are applied to the coated asphalt sheet by granule applicator 80. The granules are pressed into the sheet in any suitable manner, such as granule press 82, and are cut into individual shingles 84 by cutting cylinder 86. An individual shingle is shown in FIG. 7. After the discrete shingles are formed, they can be processed with commonly used apparatus for handling such shingles, such as shingle stacker 88 to form stacks 90 of shingles, and bundle packager 92 to form shingle bundles 94. The use of a layer of asphalt fibers in the construction of a shingle or other roofing product enables the selective positioning of a layer having specific properties. For example, if the asphalt fibers in the layer are modified with a polymer to provide high flexibility or elasticity, the use of the layer enables placement of high elasticity asphalt at the top portion of the shingle (where elasticity is needed) without requiring all of the coating asphalt to be modified. This construction would give a better performing shingle without much additional cost.

EXAMPLE VIII

Asphalt roofing shingles were made by laminating an asphalt fiber layer made as in Example II above with a wet process shingle mat. The laminated mat was then coated with filled coating asphalt to make a shingle. The Elmendorf tear strength of the resulting shingle was 1953 grams. This is about 9 percent higher than the typical tear strength for conventional shingles.

The process for making highway reinforcement products shown in FIG. 8 includes glass spinner 100 mounted for coaxial rotation with first asphalt spinner 102. Molten glass 104 supplied to the spinner is centrifuged from the glass spinner in the form of glass fibers 106. Molten asphalt 108 supplied to the first asphalt spinner is centrifuged into asphalt fibers 110 by the first asphalt spinner. The asphalt fibers preferably have a diameter within the range of from about 25 to about 60 Ht. This cofiberizing of the glass fibers and the asphalt fibers commingles the two materials and integrates them with each other. The glass fibers and the asphalt fibers can be turned downwardly by annular blowers, not shown.

The glass spinner and first asphalt spinner are positioned above a collecting surface, such as conveyor 112. Where desired, a reinforcement mat, such as open weave glass grid 114 can be feed onto the conveyor and directed beneath the flow of integrated asphalt and glass fibers. The reinforcement mat can be any type suitable for reinforcing pavement layers, either woven or nonwoven, of organic or inorganic materials, and preferably in the form of an open weave or grid. The integrated asphalt and glass fibers are collected on top of the glass grid to produce highway reinforcement product 116. Preferably, the integrated asphalt and glass fibers are consolidated by calendering roll 117.

Optionally, tack coating material 118 can be applied to the top of the highway reinforcement product from any suitable source, such as tack coat spray applicator 120. The tack coat can be any suitable adhesive for bonding the highway reinforcement product to the roadway, such as an asphalt adhesive. Preferably, the tack coat is tacky at a temperature of 25° C., as measured by ASTM rolling ball test D-2131, according to which values above about 4 cm are considered not tacky.

An optional procedure to apply a tack coat is shown in FIG. 8. A second layer of asphalt fibers 126 produced by second asphalt spinner 128 can be laid down on top of the highway reinforcement product. Preferably, the second asphalt spinner is in general alignment with the first asphalt spinner along the length of the collecting surface. The asphalt stream 130 being supplied to the second asphalt spinner is of a composition which will create tacky fibers. This can be accomplished in several ways, such as by using an asphalt with a high penetration ratio. Preferably, the tacky asphalt fibers have a diameter within the range of from about 25 to about 60 Ht. When the tacky coating or layer is applied in the form of tacky asphalt fibers, the spray applied tack coat 118 is usually not necessary. Preferably, the tacky asphalt fibers are tacky at a temperature of 25° C.

Figure 9:
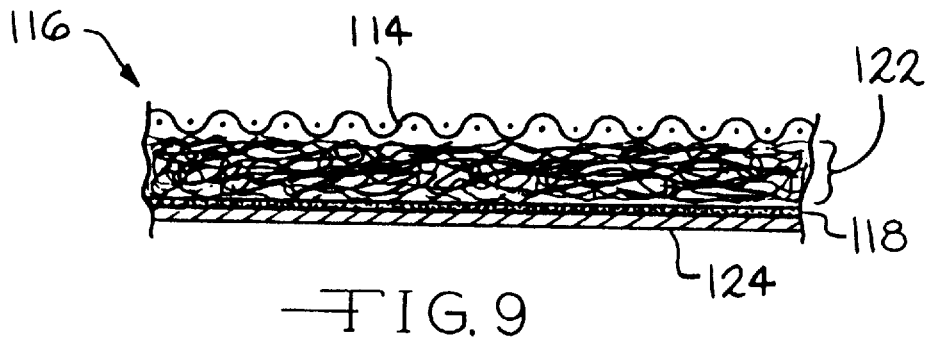
FIG. 9 is a schematic cross-sectional view in elevation of a highway reinforcement product according to the invention.

As shown in FIG. 9, the highway reinforcement product has reinforcement mat or glass grid 114 as its top layer, since as applied to the highway the product is inverted from the orientation shown in FIG. 8. In the middle of the product is layer 122 which is the integrated glass fibers 106 and asphalt fibers 110. The bottom layer is tack coat 118. Finally, the highway reinforcement product can contain release paper 124 to facilitate unwinding the product at the highway paving site.

It will be evident from the foregoing that various modifications can be made to this invention. Such, however, are considered as being within the scope of the invention.

INDUSTRIAL APPLICABILITY

The invention can be useful in the manufacture of reinforcement products of asphalt and glass fibers, and in the manufacture of asphalt roofing shingles.

We claim:

1. An integrated glass fiber and asphalt fiber product made by the method comprising:
   a. establishing a downwardly moving veil of reinforcement fibers of heat-softenable material;
   b. supplying molten asphalt to a rotating asphalt spinner positioned within the veil of reinforcement fibers;
   c. centrifuging asphalt fibers from the asphalt spinner, thereby directing the asphalt fibers into engagement with the veil to integrate the asphalt with the reinforcement fibers; and,
   d. collecting the integrated asphalt and reinforcement fibers.

2. The integrated glass fiber and asphalt fiber product of claim 1 in which the asphalt is modified with one or more organic modifiers from the group consisting of natural rubber, synthetic rubber, elastomers, polymers, resins and other thermoplastic or thermoset materials, the modifiers being present in an amount within the range of from about 2 to about 30 percent.

3. The integrated glass fiber and asphalt fiber product of claim 2 in which the modifiers are present in an amount within the range of from about 4 to about 12 percent.

4. The integrated glass fiber and asphalt fiber product of claim 1 in which the asphalt has been subjected to an oxidizing process sufficient to give the asphalt a softening point within the range of from about 180° to about 350° F.

5. The integrated glass fiber and asphalt fiber product of claim 4 in which the asphalt has been subjected to an oxidizing process sufficient to give the asphalt a softening point within the range of from about 200° to about 270° F.

6. An integrated glass fiber and asphalt fiber product made by the method comprising:
   a. centrifuging glass fibers from one or more rotary glass spinners to establish one or more downwardly moving veils of glass fibers positioned above a collecting surface, the veils of glass fibers being aligned generally along the length of the collecting surface;
   b. centrifuging asphalt fibers from one or more rotary asphalt spinners to establish one or more downwardly moving veils of asphalt fibers positioned above the collecting surface, the veils of asphalt fibers being aligned generally along the length of the collecting surface, the veils of asphalt fibers alternating with the veils of glass fibers along the length of the collecting surface to integrate the asphalt fibers and the glass fibers; and,
   c. collecting the integrated glass fibers and asphalt fibers on the collecting surface.

7. The integrated glass fiber and asphalt fiber product of claim 6 in which the integrated glass fibers and asphalt has a density within the range of from about 2 to about 15 pcf.

8. The integrated glass fiber and asphalt fiber product of claim 6 in which the asphalt is modified with one or more organic modifiers from the group consisting of natural rubber, synthetic rubber, elastomers, polymers, resins and other thermoplastic or thermoset materials, the modifiers being present in an amount within the range of from about 2 to about 30 percent.

9. The integrated glass fiber and asphalt fiber product of claim 8 in which the modifiers are present in an amount within the range of from about 4 to about 12 percent.

10. The integrated glass fiber and asphalt fiber product of claim 6 in which the asphalt has been subjected to an oxidizing process sufficient to give the asphalt a softening point within the range of from about 180° to about 350° F.

11. The integrated glass fiber and asphalt fiber product of claim 10 in which the asphalt has been subjected to an oxidizing process sufficient to give the asphalt a softening point within the range of from about 200° to about 270° F.

12. The integrated glass fiber and asphalt fiber product of claim 11 in which the integrated glass fibers and asphalt has a density within the range of from about 2 to about 15 pcf, and in which the asphalt is modified with one or more organic modifiers from the group consisting of natural rubber, synthetic rubber, elastomers, polymers, resins and other thermoplastic or thermoset materials, the modifiers being present in an amount within the range of from about 4 to about 12 percent.

13. The integrated glass fiber and asphalt fiber product of claim 1 in which the weight percent of the organic components is within the range of from about 20 to about 80 percent of the total product.

14. The integrated glass fiber and asphalt fiber product of claim 13 in which the weight percent of the organic components is within the range of from about 60 to about 65 percent of the total product.

15. The integrated glass fiber and asphalt fiber product of claim 2 in which the weight percent of the organic components is within the range of from about 20 to about 80 percent of the total product.

16. The integrated glass fiber and asphalt fiber product of claim 15 in which the weight percent of the organic components is within the range of from about 60 to about 65 percent of the total product.

17. An integrated glass fiber and asphalt fiber product made by the method comprising:
   a. centrifuging glass fibers from one or more rotary glass spinners to establish one or more downwardly moving veils of glass fibers positioned above a collecting surface, the veils of glass fibers being aligned generally along the length of the collecting surface;
   b. centrifuging asphalt fibers from one or more rotary asphalt spinners to establish one or more downwardly moving veils of asphalt fibers positioned above the collecting surface, the veils of asphalt fibers being aligned generally along the length of the collecting surface, the veils of asphalt fibers alternating with the veils of glass fibers along the length of the collecting surface to integrate the asphalt fibers and the glass fibers;

c. collecting the integrated glass fibers and asphalt fibers on the collecting surface; and d. consolidating the integrated glass fibers and asphalt to form a product having a density within the range of from about 65 to about 120 pcf.

18. The integrated glass fiber and asphalt fiber product of claim 17 in which the asphalt is modified with one or more organic modifiers from the group consisting of natural rubber, synthetic rubber, elastomers, polymers, resins and other thermoplastic or thermoset materials, the modifiers being present in an amount within the range of from about 2 to about 30 percent.

19. The integrated glass fiber and asphalt fiber product of claim 17 in which the asphalt has been subjected to an oxidizing process sufficient to give the asphalt a softening point within the range of from about 180° to about 350° F.

20. The integrated glass fiber and asphalt fiber product of claim 17 in which the integrated glass fibers and asphalt has a density within the range of from about 2 to about 15 pcf.

* * * * *